US012399914B1

(12) United States Patent
Gajbhiye et al.

(10) Patent No.: US 12,399,914 B1
(45) Date of Patent: Aug. 26, 2025

(54) METHOD AND SYSTEM FOR CONTINUOUS CLUSTERING OF A CONTINUOUS STREAM OF SOFTWARE DEVELOPMENT LIFECYCLE (SDLC) ARTIFACTS

(71) Applicant: LTI Mindtree Ltd, Mumbai (IN)

(72) Inventors: Samar Gajbhiye, Mumbai (IN); Adish Apte, Mumbai (IN); Arindam Bhattacharya, Mumbai (IN)

(73) Assignee: LTI Mindtree Ltd., Mumbai (IN)

( * ) Notice: Subject to any disclaimer, the term of this patent is extended or adjusted under 35 U.S.C. 154(b) by 0 days.

(21) Appl. No.: 18/659,319

(22) Filed: May 9, 2024

(30) Foreign Application Priority Data

Feb. 21, 2024 (IN) .............................. 202421012549

(51) Int. Cl.
*G06F 16/00* (2019.01)
*G06F 8/77* (2018.01)
*G06F 16/28* (2019.01)

(52) U.S. Cl.
CPC .............. *G06F 16/287* (2019.01); *G06F 8/77* (2013.01)

(58) Field of Classification Search
None
See application file for complete search history.

(56) References Cited

U.S. PATENT DOCUMENTS

| 2015/0363294 A1* | 12/2015 | Carback, III | G06F 8/70 717/132 |
| 2024/0028327 A1* | 1/2024 | Deshpande | G06N 5/022 |
| 2024/0248995 A1* | 7/2024 | Gazit | G06F 8/77 |

* cited by examiner

*Primary Examiner* — Anhtai V Tran
(74) *Attorney, Agent, or Firm* — CHIP LAW GROUP

(57) ABSTRACT

Disclosed is a method and system for clustering a continuous stream of software development lifecycle (SDLC) artifacts. The method and system receives and preprocesses SDLC artifacts. Subsequently, a first set of topics is generated based on application of topic modelling and each SDLC artifact is clustered into a topic of the first set of topics. In the absence of topic count, a coherence process analyzes relationships and patterns within the data to determine the topic count. In case of a skewed distribution of records in the topics, skewed keywords are eliminated before rerunning the coherence process. Upon detecting an updated stream of SDLC artifacts, a second set of topics is generated. Thereafter, a similarity between the first set of topics and the second set of topics is evaluated, to perform re-clustering of the SDLC artifacts. The method and system also enables SMEs to verify and provide feedback for dynamic clustering.

22 Claims, 9 Drawing Sheets

METHOD AND SYSTEM FOR CONTINUOUS CLUSTERING OF A CONTINUOUS STREAM OF SOFTWARE DEVELOPMENT LIFECYCLE (SDLC) ARTIFACTS

FIELD

Various embodiments of the present disclosure generally relate to clustering of streaming data. More specifically, the present disclosure relates to a method and system for clustering a continuous stream of software development lifecycle (SDLC) artifacts, including requirements, test cases (TC), defects (DF) and user stories (US) enabling extraction of rich insights from the SDLC artifacts.

BACKGROUND

In the evolving landscape of data analysis and information extraction, the clustering of data points has emerged as a pivotal technique for organizing and understanding vast datasets. Clustering involves the grouping of similar data points based on various attributes, facilitating pattern recognition, and insightful data interpretation. Traditional approaches to clustering have often been static, applying clustering techniques to a predetermined dataset without considering the dynamic nature of evolving information streams.

Static clustering methods encounter challenges when applied to dynamic datasets. The inherent nature of static clusters fails to address the influx of new information, leading to outdated and less accurate cluster representations. In scenarios where entities within the data exhibit temporal evolution, traditional clustering approaches struggle to capture the nuanced changes and relationships within the dataset.

In the context of Software Development Life Cycle (SDLC), the challenges associated with clustering become particularly pronounced. SDLC involves a continuous and iterative process, generating a plethora of artifacts such as defects, user stories, and test cases. These entities evolve over time, making static clustering insufficient for providing meaningful insights. The need to cluster SDLC artifacts becomes crucial for extracting rich insights into the software development process, identifying hotspots, and facilitating informed decision-making by project stakeholders.

To overcome the aforementioned drawbacks, it is imperative to undertake significant development efforts for an innovative solution that can proactively cluster a continuous stream of SDLC artifacts for enabling rich insights, such as providing an insight into the hotspots where the major issues are concentrated. Similarly, assisting test and development managers to reduce technical debt by identifying and eliminating duplicate or overlapping test cases and user stories. By doing so, it enables teams to concentrate their efforts on relevant testing and development tasks. Furthermore, it facilitates Knowledge Management by organizing SDLC assets into logical business functional groupings, thereby enhancing overall efficiency and productivity.

There is therefore a need for a method and system that continuously clusters a continuous stream of SDLC data artifacts to derive insights proactively.

Limitations and disadvantages of conventional and traditional approaches will become apparent to one of skill in the art, through comparison of described systems with some aspects of the present disclosure, as set forth in the remainder of the present application and with reference to the drawings.

SUMMARY

In accordance with embodiments, the present disclosure provides a system and method for clustering a continuous stream of software development lifecycle (SDLC) artifacts using topic modelling. The system and method includes receiving the continuous stream of SDLC artifacts and performing preprocessing on the received continuous stream of SDLC artifacts. Thereafter, the system and method generates, based on application of topic modelling on the SDLC data, a first set of topics for clustering each SDLC artifact into a topic of the first set of topics based on keywords associated with each SDLC artifact.

In case, a number of topics are not available applying a coherence process to determine the number of topics based on an available number of records and a text data in each record associated with the stream of SDLC artifacts, wherein the coherence process analyzes the relationships and patterns within the stream of SDLC artifacts to identify distinct topics, wherein the coherence process estimates the number of topics present in the SDLC artifacts by examining the content and context of the records associated with the stream of SDLC artifacts. The method detects if distribution of records is skewed, wherein the distribution of records is skewed if count of records in one or more topics exceeds a predefined percentage of the total record count. Consequently, the method eliminates skewed keywords responsible for skewing the distribution of records in the one or more topics and re-run the coherence process to determine the number of topics without an influence of skewed keywords.

The system and method further includes detecting an updated stream of SDLC artifacts. Subsequent to detecting the updated stream of SDLC artifacts, the system and method dynamically generates a second set of topics. Thereafter, the method and system evaluates a similarity between the first set of topics and the second set of topics, wherein evaluating comprises determining if a count of topics in the first set of topics and the second set of topics are the same. After evaluation, the method and system clusters, each SDLC artifact of the updated stream of SDLC artifacts into a topic of the first set of topics based on keywords if the count of topics in the first set of topics and the second set of topics are same. Otherwise, the method and system re-clusters each SDLC artifact of the updated stream of SDLC artifacts, including the already clustered artifacts, based on the revised set of topics, if the count of topics in first set of topics is less than the second set of topics.

One or more advantages of the prior art are overcome, and additional advantages are provided through the disclosure. Additional features are realized through the technique of the disclosure. Other embodiments and aspects of the disclosure are described in detail herein and are considered a part of the disclosure.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the disclosure.

Figure 1:
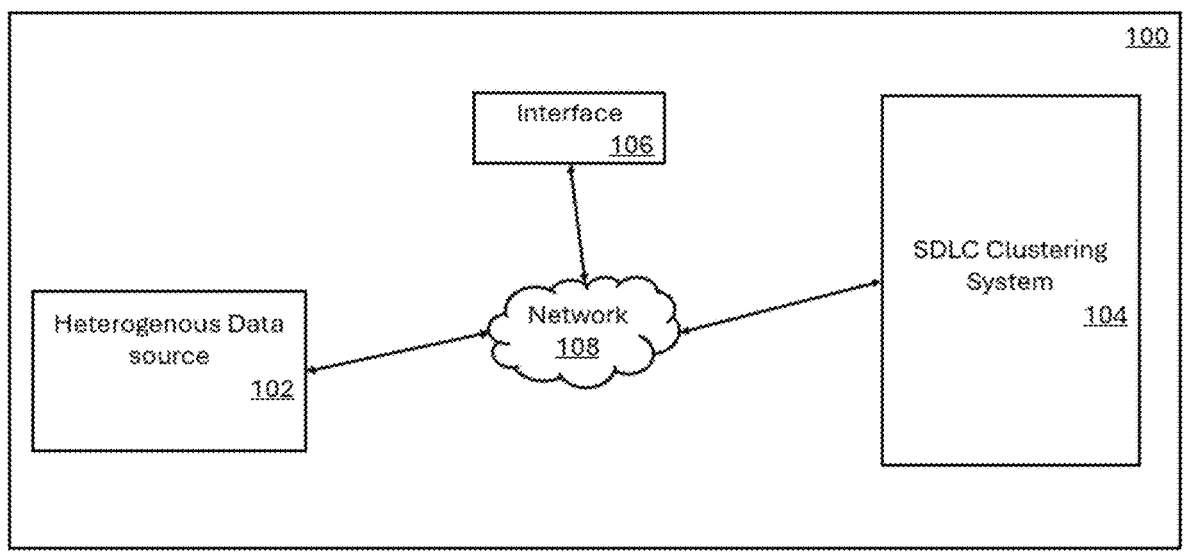
FIG. 1 is a diagram that illustrates an environment 100 in which various embodiments of the disclosure can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The following described limitation may be found in a system and method for clustering a continuous stream of software development lifecycle (SDLC) artifacts using topic modelling as disclosed herein.

Before describing in detail embodiments that are in accordance with the present disclosure, it should be observed that the embodiments reside primarily in combinations of method steps and components related to a method and system for continuous clustering of a continuous stream of SDLC artifacts. Accordingly, the system and method operations have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Systems, methods, and non-transitory computer readable media having stored thereon machine-readable instructions to cluster a continuous stream of SDLC artifacts are disclosed herein. The systems, methods, and non-transitory computer readable media disclosed herein clusters the continuous stream of SDLC artifacts by continuous application of topic modelling as and when new data gets added to the continuous stream of SDLC artifacts. The systems, methods, and non-transitory computer readable media disclosed herein provides an interface for subject matter experts (SMEs) to interact with the system for verification of cluster allocations enabling correction of misallocated SDLC artifacts into appropriate clusters.

In one general aspects of this disclosure, a system of one or more computer executable software and data, computer machines and components thereof, networks, and/or network equipment can be configured to perform particular operations or actions individually, collectively, or in a distributed manner to cause the system of components thereof to perform continuous clustering of stream of SDLC artifacts and facilitating SME to verify the cluster allocation and enabling correction of misallocated SDLC artifacts into appropriate clusters.

The term SDLC, as disclosed herein, refers to the process employed by the software industry to design, develop, and test software of high quality. The SDLC aims to produce software that meets or exceeds customer expectations, while adhering to specified completion timeframes and cost estimates. In other words, the SDLC, as disclosed herein, also encompasses a dashboard of information that enables technology leaders to assess the overall performance of their entire software development organization.

In the context of SDLC, digital assets encompass a diverse array of elements integral to a software development project. These assets may comprise but are not limited to, documentation, test plans, images, data files, executable modules, user stories, source code, defects, incidents, application log files, test cases, build and deploy statistics (e.g., success, failure, error, and warning codes), messages, or any other pertinent components. Additionally, digital assets encompass artifacts such as design documents, data models, workflow diagrams, test matrices and plans, setup scripts, and similar materials that play crucial roles throughout the development process.

As used throughout this specification, computer-executable software and data can include one or more of algorithms, software applications, business transactions, insights, alerts, recommendations, databases, datasets (e.g., historical datasets), drivers, data structures, firmware, graphical user interfaces, instructions, machine learning (i.e., supervised, semi-supervised, reinforcement, and unsupervised), middleware, modules, objects, operating systems, processes, programs, scripts, tools (e.g., for stress testing and chaos stress testing), and utilities.

The computer-executable software and data is stored in tangible, non-volatile, computer-readable memory (locally or in network-attached storage) and can operate autonomously, on-demand, on a schedule, and/or spontaneously. Computer machines can include one or more: general-purpose or special-purpose network-accessible personal computers, desktop computers, laptop or notebook computers, distributed systems, workstations, portable electronic devices, facsimile machines, multifunction devices, and/or servers having one or more microprocessors for executing or accessing the computer-executable software and data.

The servers can be virtual or physical, on-premises or remote, and can include one or more: application servers, cybersecurity servers, test servers, and/or web servers for executing, accessing, and/or storing the computer-executable software and data. Computer networks can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated network equipment such as access points, ethernet adaptors (physical and wireless), firewalls, hubs, modems, routers, and/or switches located inside the network and/or on its periphery, as well as software executing on any of the foregoing.

Pursuant to various embodiments, the SDLC clustering system receives a continuous stream of SDLC artifacts and preprocess the SDLC artifacts before generating a first step of topics for clustering each SDLC artifact into a respective topic based on one or more keywords present in each SDLC artifact. The SDLC clustering system continuously monitors arrival of updated stream of SDLC artifacts, upon receiving an updated stream of SDLC artifacts, the SDLC clustering system generates a second set of topics. Thereafter, the system compares the number of topics in the first set of topics and the second set of topics. In case the number of topics is same, the SDLC clustering system clusters the SDLC artifacts among the first set of topics. Otherwise, the SDLC clustering system re-clusters the SDLC artifacts (including the already allocated artifacts) among the second set of topics.

The SDLC clustering system also provides an interface for SMEs to verify allocation of SDLC artifacts in the clusters as the topics and correct misallocated SDLC artifacts. Upon correction, the SDLC clustering system assigns keywords to the ID of corrected SDLC artifacts, thereby enabling preserving their allocation within the corrected clusters and avoiding reshuffling to incorrect clusters in the next cycle of clustering.

FIG. 1 is a diagram that illustrates an environment 100 in which various embodiments of the disclosure can be implemented. Referring to FIG. 1, environment 100 may include a heterogeneous data source 102, a SDLC clustering system 104, an interface 106 and a network 108.

In accordance with an embodiment of the disclosure, the heterogeneous data source 102 stores a plurality of SDLC data artifacts collected or obtained from various sources. The data includes structured, semi-structured, and unstructured data, such as defects, test cases, user stories, log files, emails, and more.

The SDLC clustering system 104 interacts with the interface 106 over the network 108 for receiving the continuous stream of SDLC artifacts from the heterogeneous data source 102. Upon receiving the data, the SDLC clustering system 104 clusters the data into one or more clusters by applying topic modelling. The SDLC artifacts are clustered in topics that enable extraction of rich insights.

As shown in FIG. 1, the network 108 could be a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 108 enables communication among the various components operating in the environment 100.

Figure 2:
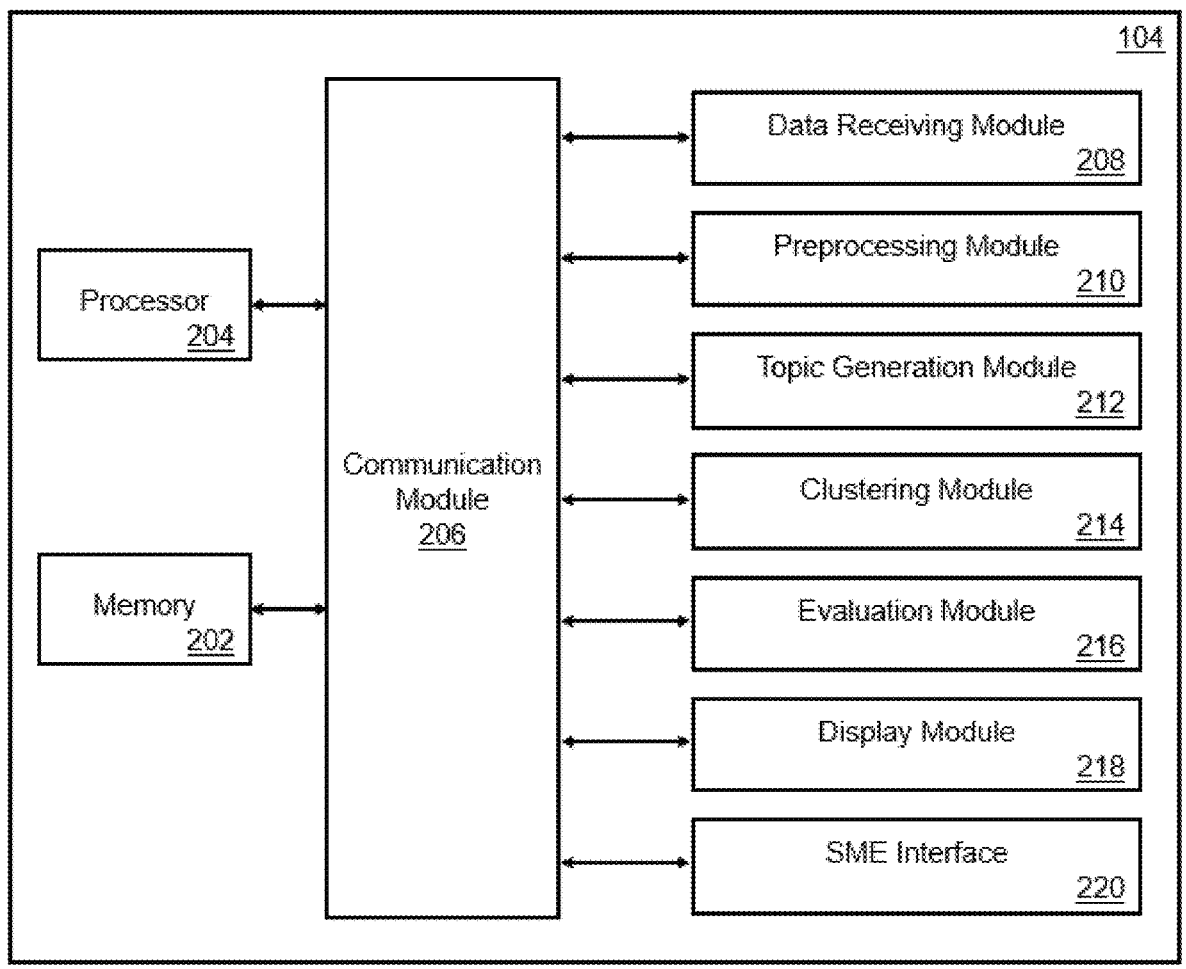
FIG. 2 is a diagram that illustrates a system diagram of the SDLC clustering system 104 in accordance with an embodiment of the disclosure.

FIG. 2 is a diagram that illustrates a system 200 diagram of the SDLC clustering system 104 in accordance with an embodiment of the present disclosure. Referring to FIG. 2, the system 200 includes a memory 202, a processor 204, a communication module 206, a data receiving module 208, a preprocessing module 210, a topic generation module 212, a clustering module 214 and an evaluation module 216 a display module 218, and a SME interface 220.

The memory 202 may comprise suitable logic and/or interfaces that may be configured to store instructions (for example, the computer-readable program code) that can implement various aspects of the present disclosure. In an embodiment, the memory 202 includes random access memory (RAM), read only memory (ROM), a hard disk drive, and/or another type of memory (e.g., a flash memory, a magnetic memory, and/or an optical memory), volatile and nonvolatile memory.

The processor 204 may comprise suitable logic, interfaces, and/or code that may be configured to execute the instructions stored in the memory 202 to implement various functionalities of the system 200 in accordance with various aspects of the present disclosure. The processor 204 may be further configured to communicate with multiple modules of the system 200 via the communication module 206.

The communication module 206 comprises suitable logic, interfaces, and/or code that may be configured to transmit data between modules, engines, databases, memories, and other components of the SDLC clustering system 104 for use in performing functions discussed herein. The communication module 206 may include one or more communication types and utilizes various communication methods for communication within the SDLC clustering system 104.

In one embodiment of the disclosure, the SDLC clustering system 104 clusters a continuous stream of SDLC artifacts into one more cluster for enabling rich insights, such as providing an insight into the hotspots where the major issues are concentrated. Similarly, assisting test and development managers to focus on relevant areas of testing and development.

The data receiving module 208 may comprise suitable logic, interfaces, and/or code that may be configured to receive a continuous stream of SDLC artifacts from the heterogeneous data sources 102. The SDLC artifacts may include, but are not limited to, requirements, time-series data, user stories, test cases, code files (comments), databases, defect logs, and other logs. Each entity/artifact has multiple records. Each record has multiple fields, with at least one unique field (ID) and one field with textual data.

The preprocessing module 210 may comprise suitable logic, interfaces, and/or code that may be configured to receive the continuous stream of SDLC artifacts from the data receiving module 208 and preprocess the continuous stream of SDLC artifacts. In an embodiment, the preprocessing module 210 performs tokenization and lemmatization of the SDLC artifacts. In another embodiment, the preprocessing module 210 filters the SDLC artifacts by part of speech (POS)_tags, removes unwanted data, transforms the SDLC data in lowercase and removes stop words, duplicates and spaces.

The topic generation module 212 may comprise suitable logic, interfaces, and/or code that may be configured to receive the preprocessed SDLC artifacts for generating a set of topics.

To start the process, the topic generation module 212 is configured to first determine if a number of topics are already available. In an exemplary embodiment, the SDLC clustering system 104 is configured with a number of topics preferably provided by one or more subject matter experts.

In case, it is determined that the number of topics are not available, the topic generation module 212 is configured to apply a coherence process to determine the number of topics based on the available number of records and the text data in each record associated with the stream SDLC artifacts.

In an embodiment, the coherence process analyzes the relationships and patterns within the data to identify distinct topics. In an embodiment, the coherence process estimates the number of topics present in the SDLC artifacts by examining the content and context of the records associated with the stream of SDLC artifacts.

In an embodiment, if there exists a skewed distribution of records, where the count of records in one or more topics exceeds a predefined percentage of the total record count, a distinct strategy is implemented to address the imbalance. This approach is designed to identify particular keywords contributing to the disproportionate distribution of records among different topics. These identified skewed keywords are then removed from all the original records. This step significantly enhances the quality of clusters post the application of the clustering algorithm by eliminating keywords causing skewness within the set of records.

Following the elimination of skewed keywords, the coherence process is rerun for all records, ensuring that the data is effectively organized, and meaningful clustering patterns can be captured without the influence of skewed elements.

Moving on, the topic generation module 212 is configured to generate a first set of topics based on application of topic modelling on SDLC data (artifacts). In an embodiment, the application of topic modelling includes unsupervised topic modelling.

In an embodiment, the topic generation module 212 assigns a unique topic name to each topic of the first set of topics based on keywords derived from the SDLC artifacts.

Subsequently, the clustering module 214 may comprise suitable logic, interfaces, and/or code that may be configured to cluster each SDLC artifact into a topic among the first set of topics.

In an embodiment, the clustering module 214 is configured to verify a Boolean condition to determine the existence of a clustering model in the SDLC clustering system 104. In instances, when it is determined that the clustering model already exists, the clustering model is used for clustering the SDLC artifacts.

Conversely, in cases where no clustering model is identified within the SDLC clustering system 104, the clustering module 214 is configured to generate a new clustering model. In this embodiment, the clustering module 214 selects an appropriate clustering algorithm from a set of clustering algorithms available in the SDLC clustering system 104. The selection is based on the number of records in the stream of SDLC artifacts.

In a specific embodiment, the process involves mapping the existing clustering model to the new clustering model by considering IDs and keywords. A matching score, determined based on the IDs and keywords, is employed to ensure precise and accurate mapping between the two models.

To elaborate on a specific scenario, when a skewed distribution of records is detected, the SDLC clustering system 104 executes two cycles of the clustering process, incorporating an empirically derived number of topics approximation framework. This framework aims to distribute the records into predefined topic counts based on the total number of records. The initial run of the clustering process focuses on the skewed topics identified through the coherence process, where the count of records exceeds a predefined percentage of the total record count.

Subsequently, the second and final clustering process is executed to identify the skewed keywords within the resulting topics that exceeds a predefined percentage of the number of records in the various skewed topics. These identified skewed keywords are then removed from all the original records. This innovative step significantly enhances the quality of clusters post the application of the clustering algorithm by eliminating keywords causing skewness within the set of records.

Following the elimination of skewed keywords, the clustering process is rerun with the coherence process for all records, ensuring that the data is effectively organized, and meaningful clustering patterns can be captured without the influence of skewed elements.

Once the clustering of the SDLC artifacts is done, the display module 218 may comprise suitable logic, interfaces, and/or code that may be configured to display one or more clusters (topic based) to the end-users of the system. The display of this information enables the extraction of valuable insights from the SDLC artifacts, offering a deeper understanding of concentration points for major issues, commonly referred to as hotspots. This functionality also aids test and development managers in directing their focus towards pertinent areas of testing and development.

In an embodiment, the SME interface 220 may comprise suitable logic, interfaces, and/or code that may be configured to facilitate SMEs to interact with the SDLC clustering system 104. This interaction facilitates the verification of cluster allocations for SDLC artifacts. In the event of issues, the SME interface 220 empowers SMEs to provide feedback and adjust allocations by manually relocating misallocated SDLC artifacts to an appropriate cluster (topic).

In subsequent clustering cycles, there exists a possibility that the clustering module 214 may reassign the "corrected" SDLC artifact to its earlier "incorrect" cluster due to the inherent probabilistic approach adopted by the clustering module 214 for clustering SDLC artifacts. To maintain the allocation of such corrected cases, where SMEs have intervened, the SDLC clustering system 104 assigns keywords to the IDs of corrected SDLC artifacts. This aids in preserving their allocation within the corrected clusters and prevents reshuffling into incorrect clusters.

In an embodiment, the SDLC clustering system 104 includes an automated feedback mechanism that is configured to utilize the feedback provided by SMEs and the corrected cluster assignment by SMEs to improve the clustering model.

Continuing, the SDLC clustering system 104 continuously monitors the data stream to detect an updated stream of SDLC artifacts. Upon detecting such updates, the preprocessing module 210 receives the data from the data receiving module 208 and performs the previously discussed preprocessing tasks.

Thereafter, the topic generation module 212 generates a second set of topics based on application of topic modelling on SDLC data (artifacts). In an embodiment, the application of topic modelling includes unsupervised topic modelling. In an embodiment, the topic generation module 212 assigns a unique topic name to each topic of the second set of topics based on keywords derived from the SDLC artifacts.

Before proceeding to the clustering process, the evaluation module 216 may comprise suitable logic, interfaces, and/or code that may be configured to evaluate the similarity between the first set of topics and the second set of topics. In one embodiment, the evaluation module 216 determines if the count of topics in the first set equals that of the second set.

If the count of topics is same, each SDLC artifact of the updated stream of SDLC artifacts is clustered into a topic of the first set of topics.

Conversely, if the count of topics in the first set is less than that in the second set, a new clustering model is generated that is based on the count of topics from the second set by using the entire number of records.

Thereafter, the existing clustering model is mapped to the new clustering model by considering IDs and keywords. A matching score, determined based on the IDs and keywords, is employed to ensure precise and accurate mapping between the two models. Subsequently, each SDLC artifact from the updated stream, including the already clustered artifacts, is re-clustered based on the revised set of topics from the second set.

The SDLC clustering system 104 continuously updates the display module 218 to present the latest clusters, enabling end-users to make informed decisions regarding potential action items related to the SDLC artifacts.

Figure 3:
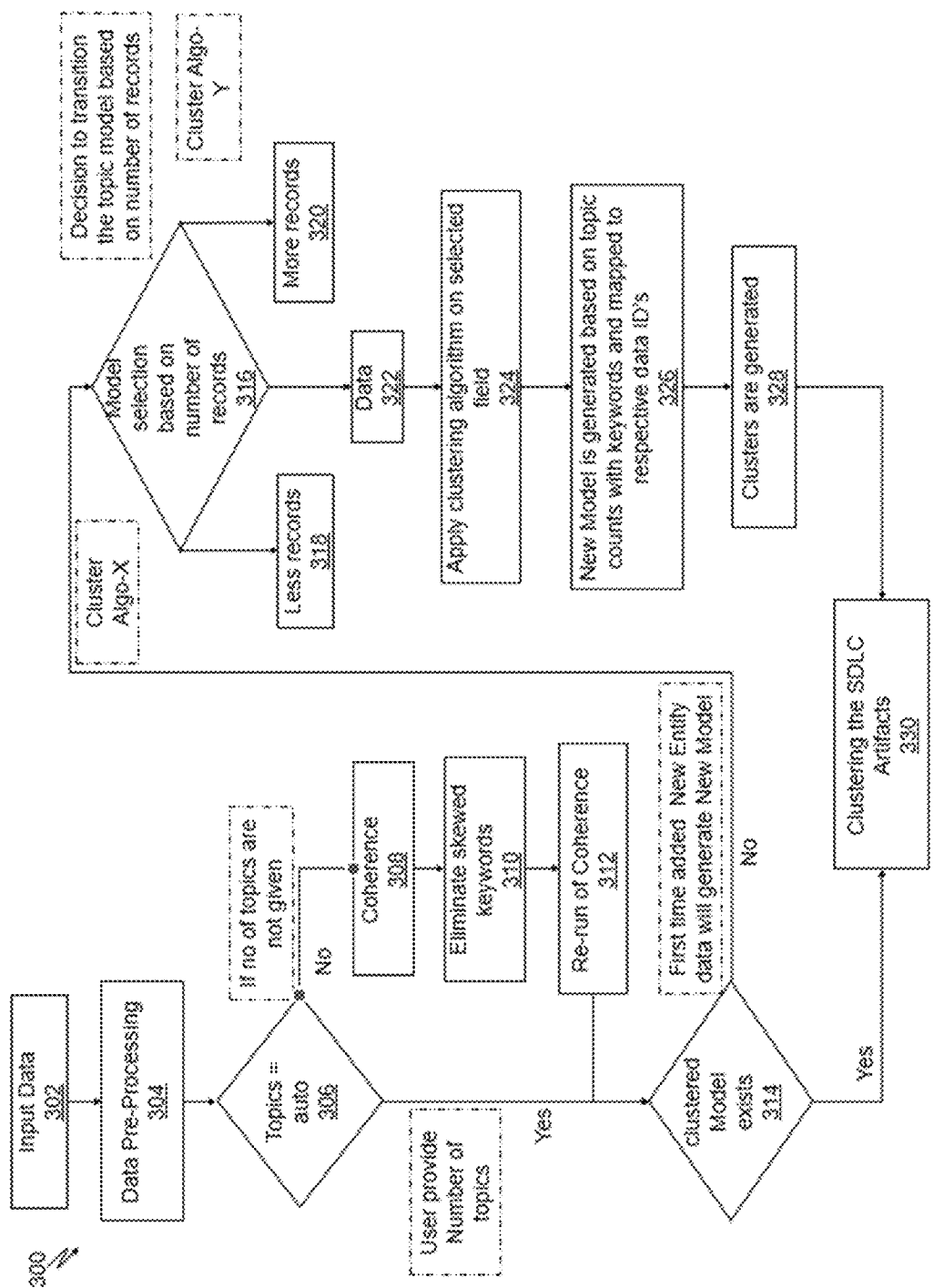
FIG. 3 is a diagram that illustrates a flowchart of a method 300 for continuous clustering of SDLC artifacts in accordance with an embodiment of the disclosure.

FIG. 3 is a diagram that illustrates a flowchart for a method 300 for continuous clustering of SDLC artifacts in accordance with an embodiment of the present disclosure.

At step 302, the SDLC clustering system 104 receives input data using the data receiving module 208. The input data includes various entities/artifacts of the SDLC, including requirements, test cases (TC), defects (DF), user stories (US), and more. Each entity/artifact has multiple records. Each record has multiple fields, with at least one unique field (ID) and one field with textual data.

At step 304, the preprocessing module 210 performs data preprocessing on the input data associated with the SDLC artifacts/entities and its selected fields. The data preprocessing involves tokenization and lemmatization, filtering by part of speech (POS) tags, removal of unwanted/exceptionable data (including special characters), conversion to lowercase, and removal of stop words, duplicates, and spaces.

Thereafter, the topic generation module 212 receives the preprocessed SDLC artifacts for generating a set of topics. At step 306, it is determined if a number of topics are already available. In case, the number of topics is not available the topic generation module 212 applies a coherence process, at step 308, to determine the number of topics based on the available number of records and the text data in each record associated with the stream SDLC artifacts.

Once the number of topics is derived through the coherence process, at step 310, a process for elimination of skewed keywords is performed to improve the quality of clusters. Following the elimination of skewed keywords, at step 312, the coherence process is rerun for all records, ensuring that the data is effectively organized, and meaningful clustering patterns can be captured without the influence of skewed elements.

At step 314, the clustering module 214 verifies a Boolean condition to determine the existence of a clustering model in the SDLC clustering system 104. In instances, when it is determined that the clustering model already exists, the clustering model is used for clustering the SDLC artifacts, at step 330.

Conversely, in cases where no clustering model is identified within the SDLC clustering system 104, at steps 316, 318, 320, 322, 324, 326 and 328, the clustering module 214 generates a new clustering model. In this embodiment, the clustering module 214 selects an appropriate clustering algorithm from a set of clustering algorithms available in the SDLC clustering system 104. The selection is based on the number of records in the stream of SDLC artifacts.

The method maps the existing clustering model to the new clustering model by considering IDs and keywords. A matching score, determined based on the IDs and keywords, is employed to ensure precise and accurate mapping between the two models. In an embodiment, the topic generation module 212 assigns a unique topic name to each topic based on keywords derived from the SDLC artifacts.

Finally, at step 330, the clustering module 214 clusters each SDLC artifact into a topic among the first set of topics. Once the clustering of the SDLC artifacts is done, the display module 218 displays one or more clusters (topic based) to the end-users of the system. The display of this information enables the extraction of valuable insights from the SDLC artifacts, offering a deeper understanding of concentration points for major issues, commonly referred to as hotspots. This functionality also aids test and development managers in directing their focus towards pertinent areas of testing and development.

Figure 4:
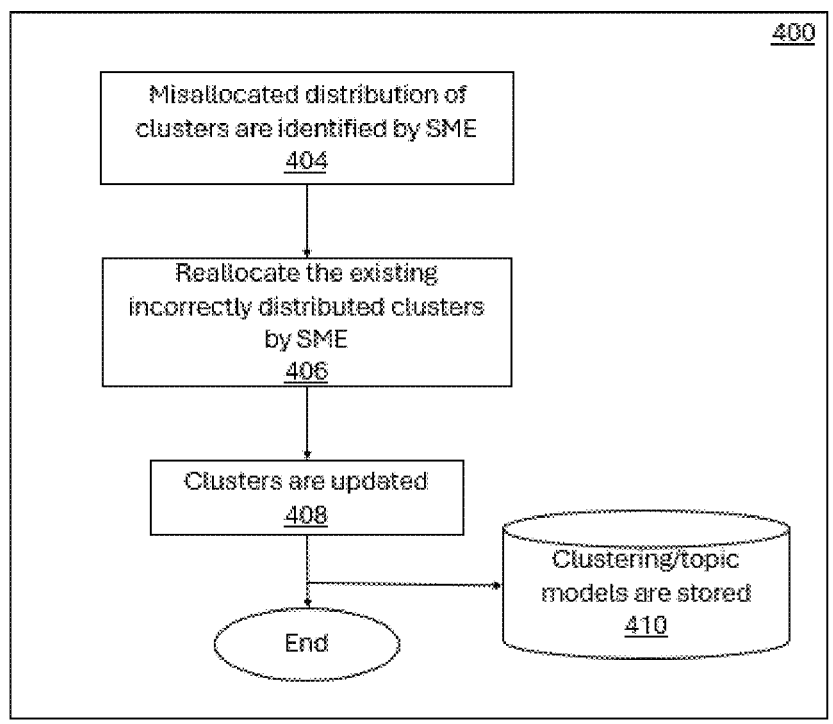
FIG. 4 is a diagram that illustrates a flowchart of a method 400 for verification of the cluster allocation of SDLC artifacts by SMEs in accordance with an embodiment of the disclosure.

FIG. 4 illustrates a flowchart for a method 400 for verification of the cluster allocation of SDLC artifacts by SMEs in accordance with an embodiment of the disclosure. Referring to FIG. 4, at step 404, the SME interface 220 facilitates SMEs to interact with the SDLC clustering system 104. This interaction facilitates the verification of cluster allocations for SDLC artifacts. In the event of issues, at step 406, the SME interface 220 enables SMEs to provide feedback and adjust allocations by manually relocating misallocated SDLC artifacts to an appropriate cluster (topic). Accordingly, at step 408, the clusters are updated.

In subsequent clustering cycles, there exists a possibility that the clustering module 214 may reassign the "corrected" SDLC artifact to its earlier "incorrect" cluster due to the inherent probabilistic approach adopted by the clustering module 214 for clustering SDLC artifacts. To maintain the allocation of such corrected cases, where SMEs have intervened, the SDLC clustering system 104 assigns keywords to the IDs of corrected SDLC artifacts. This aids in preserving their allocation within the corrected clusters and prevents reshuffling into incorrect clusters. Accordingly, at step 410 clusters and topic models are updated based on the reallocation of the incorrectly distributed clusters and storing the clustering models in the database for future usage.

Continuing, the SDLC clustering system 104 continuously monitors the data stream to detect an updated stream of SDLC artifacts.

Figure 5:
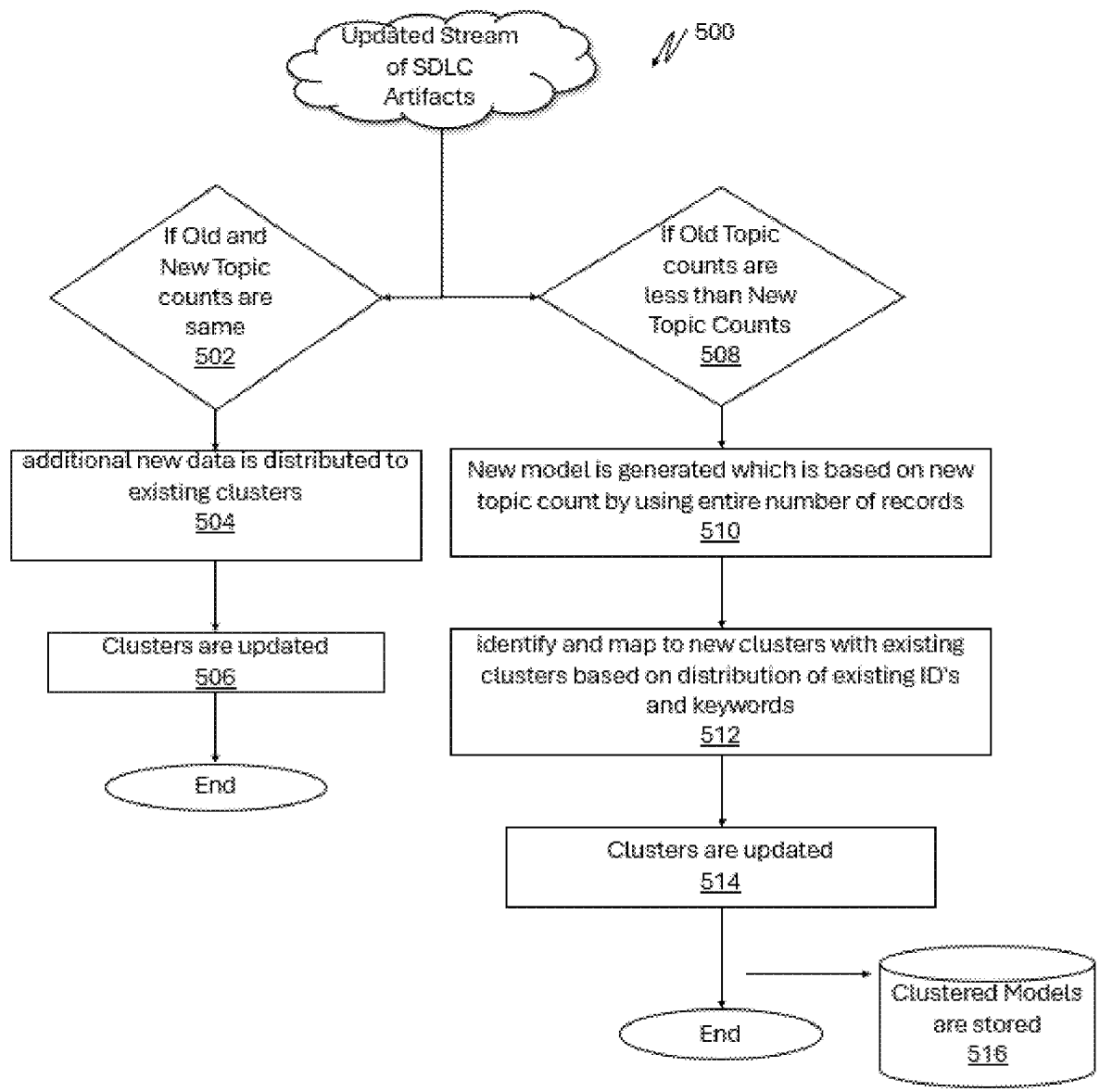
FIG. 5 illustrates a flowchart of a method for clustering the updated stream of SDLC artifacts in accordance with an embodiment of the disclosure.

FIG. 5 illustrates a flowchart of a method 500 for clustering the updated stream of SDLC artifacts in accordance with an embodiment of the disclosure. Referring to FIG. 5, it is detected if an updated stream of SDLC artifacts is received. Upon detecting such updates, the preprocessing module 210 receives the data from the data receiving module 208 and performs the previously discussed preprocessing tasks.

Thereafter, the topic generation module 212 generates a new (second) set of topics based on application of topic modelling on SDLC data (artifacts). In an embodiment, the application of topic modelling includes unsupervised topic modelling. In an embodiment, the topic generation module 212 assigns a unique topic name to each topic of the second set of topics based on keywords derived from the SDLC artifacts.

Before proceeding to the clustering process, the evaluation module 216 evaluates the similarity between the old (first) set of topics and the second set of topics. At step 502, the evaluation module 216 determines that the count of topics in the first set equals that of the second set.

At step 504, each SDLC artifact of the updated stream of SDLC artifacts is clustered into a topic of the first set of topics based on keywords present in each SDLC artifact. Accordingly, at step 506, the clusters are updated with the new SDLC artifacts.

Conversely, at step 508, it is determined that the count of topics in the first set is less than that in the second set. At step 510, a new clustering model is generated that is based on the count of topics in the second set by using entire number of records. At step 512, the method involves mapping the existing clustering model to the new clustering model by considering IDs and keywords. A matching score, determined based on the IDs and keywords, is employed to ensure precise and accurate mapping between the two models. At step 514, each SDLC artifact from the updated stream, including the already clustered artifacts, is re-clustered based on the revised set of topics from the second set. Accordingly, the clusters are updated. At step 516, the updated clusters are stored.

The SDLC clustering system 104 continuously updates the display module 218 to present the latest clusters, enabling end-users to make informed decisions regarding potential action items related to the SDLC artifacts.

Figure 6:
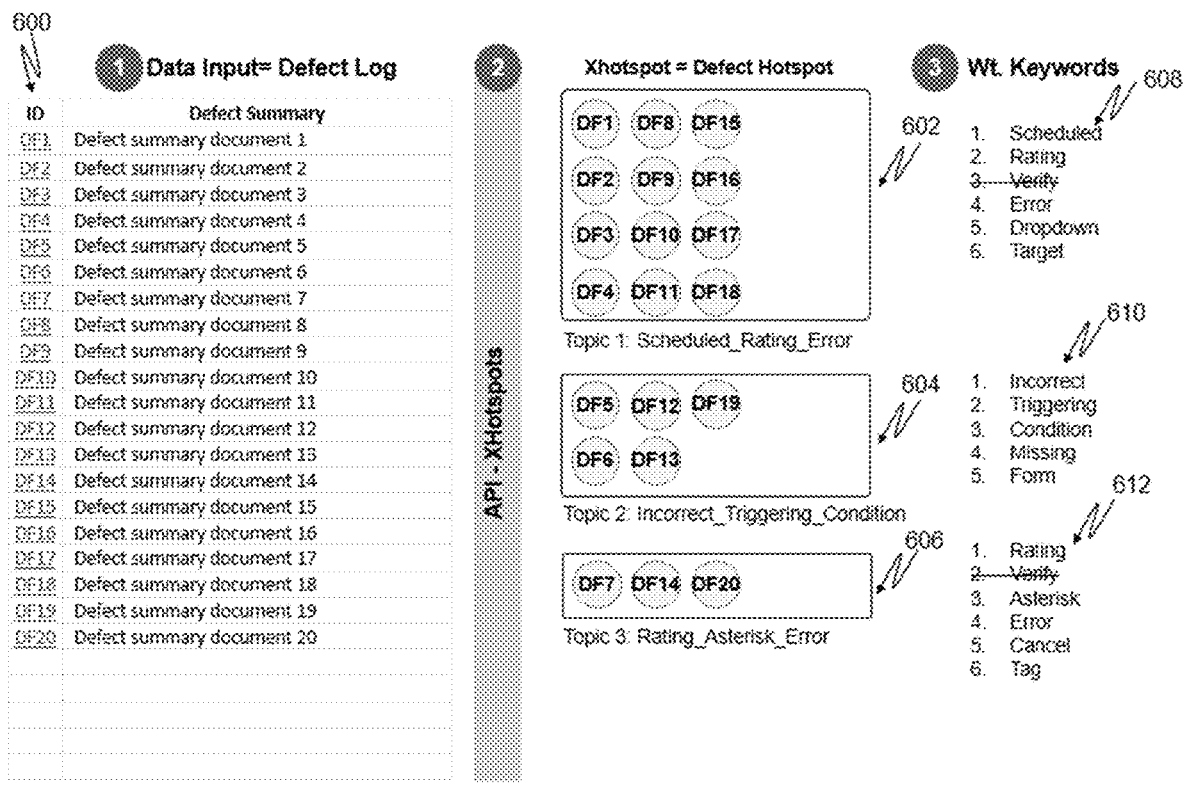
FIG. 6 is a diagram that illustrates an exemplary scenario of clustering SDLC artifacts in accordance with an exemplary embodiment of the disclosure.

FIG. 6 is a diagram that illustrates an exemplary scenario of clustering SDLC artifacts in accordance with an exemplary embodiment of the disclosure.

Referring to FIG. 6, the continuous stream of SDLC artifacts includes a defect log 600 pertaining to test cases (TC), defects (DF), user stories (US), among others. Within this data stream, 20 defect line items (entities) have been identified. Each entity consists of multiple records, with each record containing various fields, including at least one unique field (ID), such as DF1, DF2 and so on and one field with textual data (defect summary in this case). Each defect summary provides further details about the defect.

In accordance with an embodiment, the SDLC clustering system 104 initiates clustering by combining the textual data from one or more fields of each entity. These combined textual data sets serve as the basis for clustering. To achieve clustering, keywords (608, 610, 612) are extracted from the textual data of similar record types. These keywords are relevant in identifying common themes and patterns across different records.

The SDLC clustering system 104 generates clusters 602, 604 and 606 based on the number of topic counts. This number can either be provided by the user or determined by a model, leveraging coherence metrics and elimination of skewed keywords, for instance, the keyword "verify" as eliminated as it was determined to be responsible for skewing the distribution of records in the one or more topics. In an embodiment, the topic generation module 212 assigns a unique topic name to each topic based on keywords derived from the SDLC artifacts.

Finally, the clustering module 214 clusters the defects into a relevant cluster by application of topic modelling. The resultant clusters are persisted for future utilization. This approach not only aids in organizing and structuring the voluminous data within the SDLC but also facilitates insightful analysis and decision-making processes.

Figure 7:
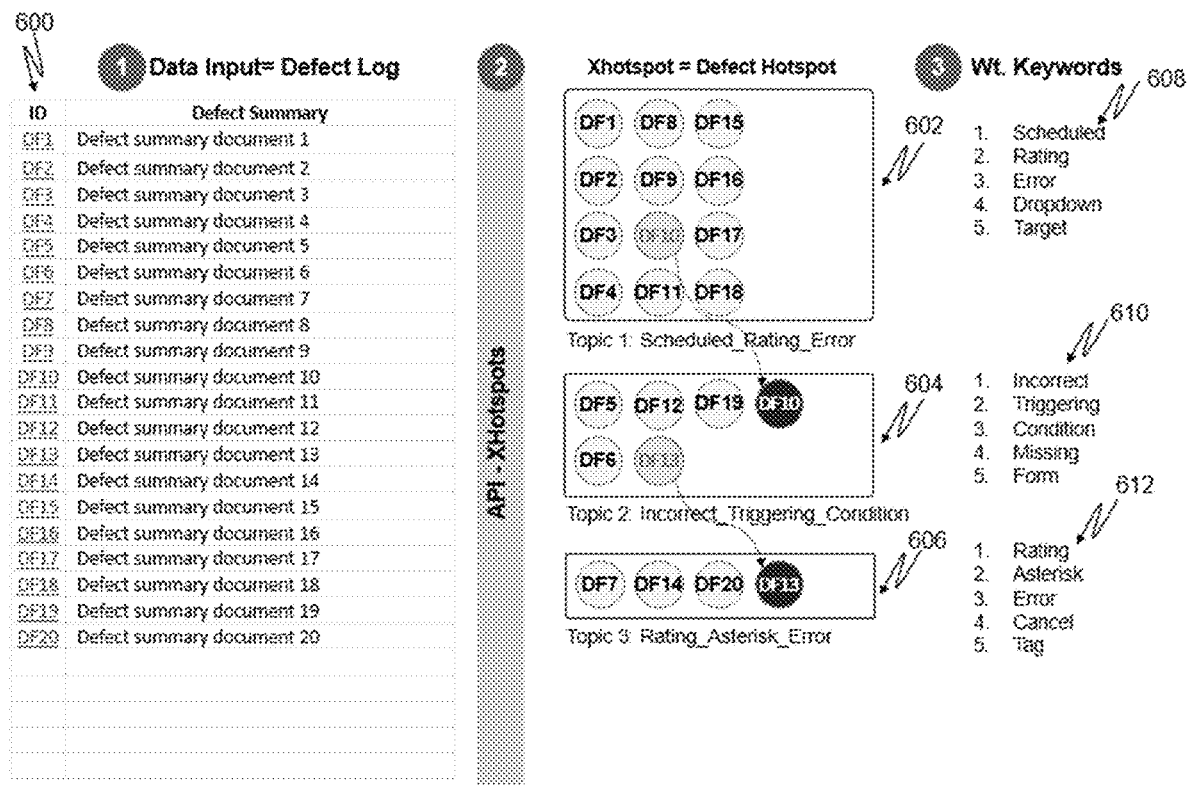
FIG. 7 is a diagram that illustrates an exemplary scenario for verification of cluster allocation by SMEs in accordance with an exemplary embodiment of the disclosure.

FIG. 7 is a diagram that illustrates an exemplary scenario for verification of cluster allocation by SMEs in accordance with an exemplary embodiment of the disclosure.

Referring to FIG. 7, the continuous stream of SDLC artifacts includes the defect log 600. Within this data stream, 20 defect line items (entities) have been identified and clustered into the clusters 602, 604 and 606 which were generated based on the keywords 608, 610 and 612.

The SDLC clustering system 104 enables SMEs to interact with the clusters. This interaction facilitates the verification of cluster allocations for SDLC artifacts. As shown in FIG. 7, the SME has identified issues with allocation of defects DF10 and DF13. Accordingly, the SME has provided feedback and adjusted allocations by manually relocating misallocated SDLC artifacts DF10 and DF13 to cluster 604 and 60,6 respectively.

To incorporate these adjustments, the newly refined clusters are integrated into the training data, and clustering algorithms are applied to optimize the performance of the clustered model. Regular updates and retraining of the model are essential to maintain its accuracy and effectiveness in handling evolving data sets.

Figure 8:
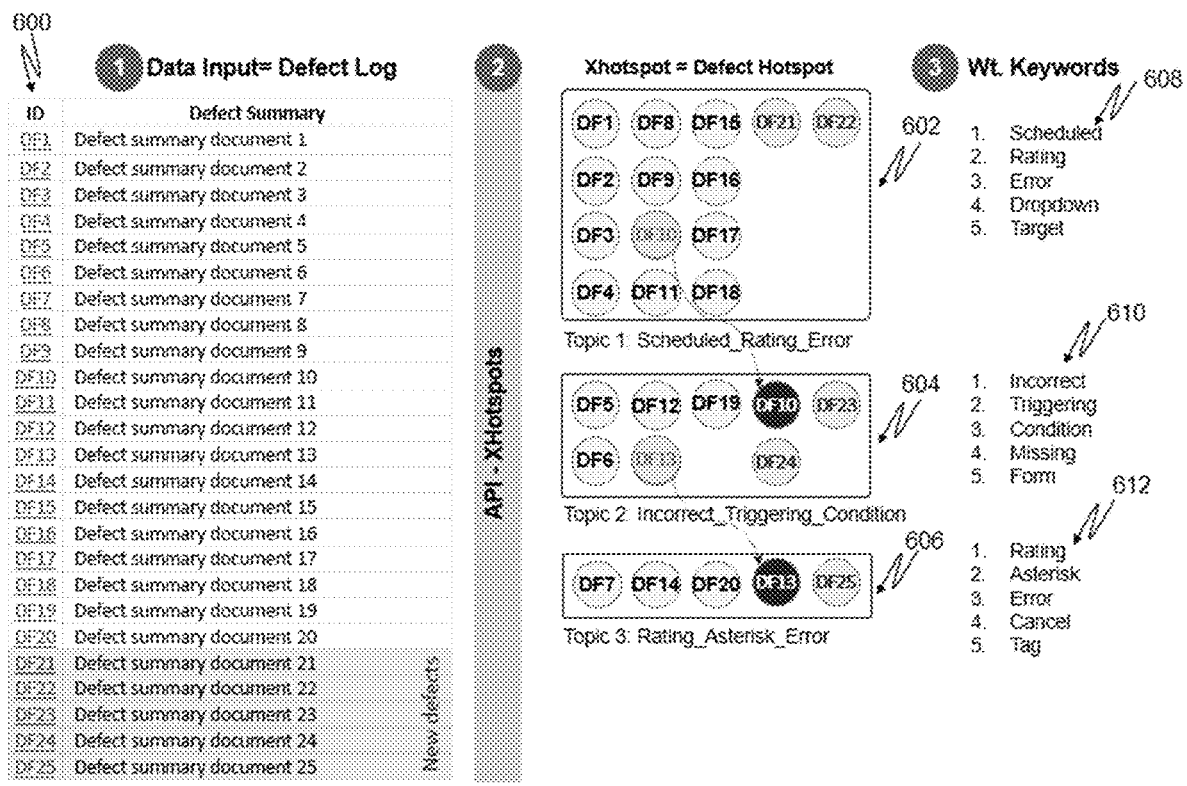
FIG. 8 is a diagram that illustrates an exemplary scenario of clustering SDLC artifacts from an updated stream of SDLC artifacts in accordance with an exemplary embodiment of the disclosure.

FIG. 8 is a diagram that illustrates an exemplary scenario of clustering SDLC artifacts from an updated stream of SDLC artifacts in accordance with an exemplary embodiment of the disclosure.

Referring to FIG. 8, within the continuous stream of SDLC artifacts, an updated defect log 600 has been identified, containing 5 additional defect line items (entities). Upon detection of these updates, the SDLC clustering system 104 initiates the generation of a new set of topics through topic modeling applied to the updated defect log 600.

Before commencing the clustering process, the SDLC clustering system 104 evaluates the similarity between the first and second sets of topics. Notably, the count of topics in both sets is found to be equal. Consequently, each defect line item from the updated defect log 600 is clustered into the topic of the first set based on keywords present in each SDLC artifact. For instance, DF21 and DF22 are clustered into 602, while DF23 and DF24 are clustered into 604, and DF25 is assigned to cluster 606. The SDLC clustering system 104 ensures that the corrections made by SMEs to artifacts DF10 and DF13 remain in their corrected clusters.

In this scenario, no new clusters are created, and the clustered model remains unchanged. However, it's crucial to note that the keywords utilized for clustering remain unaffected by these adjustments, ensuring consistency and reliability in the clustering process.

Figure 9:
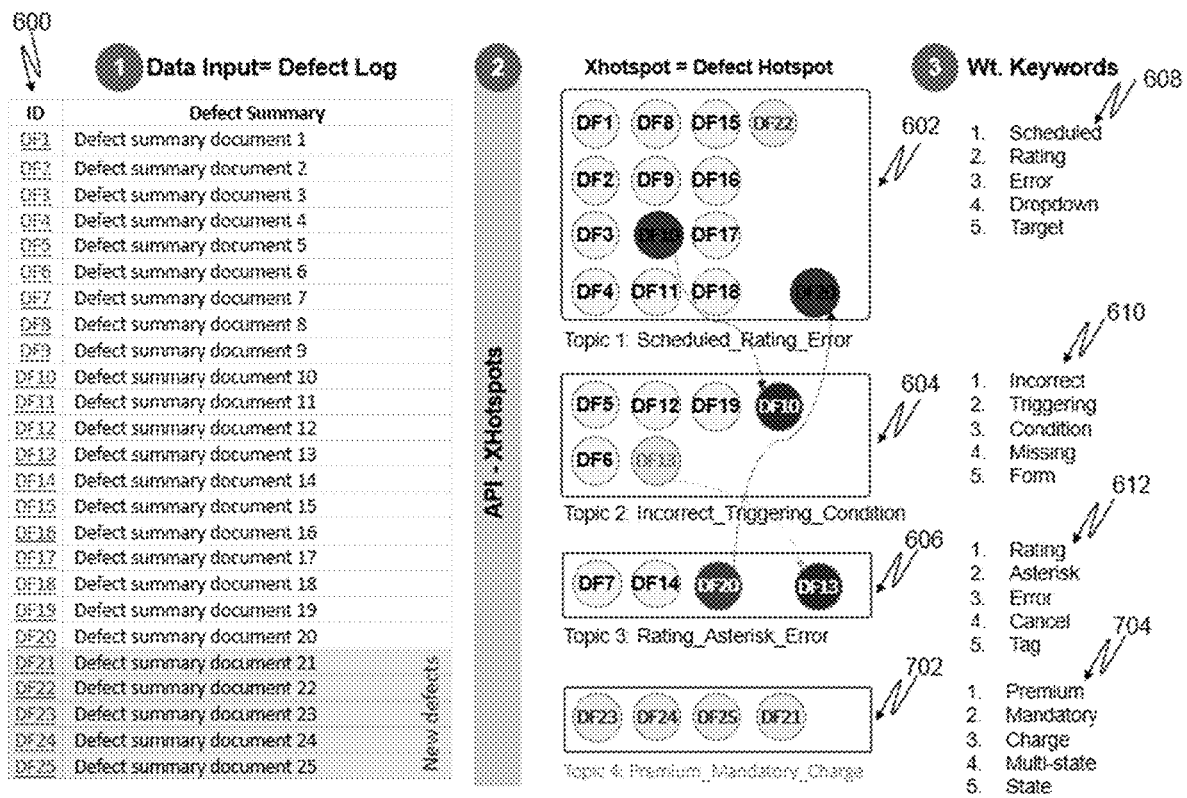
FIG. 9 is a diagram that illustrates an exemplary scenario of clustering SDLC artifacts from an updated stream of SDLC artifacts in accordance with another exemplary embodiment of the disclosure.

FIG. 9 is a diagram that illustrates an exemplary scenario of clustering SDLC artifacts from an updated stream of SDLC artifacts in accordance with another exemplary embodiment of the disclosure.

Referring to FIG. 9, within the continuous stream of SDLC artifacts, an updated defect log 600 has been identified, containing 5 additional defect line items (entities). Upon detection of these updates, the SDLC clustering system 104 initiates the generation of a new set of topics through topic modeling applied to the updated defect log 600. The new set of topics results in an additional cluster 702 (with the associated keyword set 704) apart from the existing clusters 602, 604, and 606. Furthermore, each cluster's keyword set may incorporate new keywords corresponding to the new defects.

Now, since the count of topics in the first set is less than that in the second set. Accordingly, a new clustering model is generated that is based on the second topic count by using entire number of records. The SDLC clustering system 104 maps the existing clustering model to the new clustering model by considering IDs and keywords. A matching score, determined based on the IDs and keywords, is employed to ensure precise and accurate mapping between the two models.

Moving forward, each SDLC artifact from the updated defect log 600, including the previously clustered artifacts, is re-clustered based on the revised set of topics from the second set. For example, DF21, DF23, DF24, and DF25 are clustered into the additional cluster 702, while DF21 is clustered into cluster 602. Notably, DF20, which was previously clustered into cluster 606, is relocated to cluster 602. The SDLC clustering system 104 guarantees that the corrections made by SMEs to artifacts DF10 and DF13 remain in their corrected clusters.

The SDLC clustering system 104 continuously updates the display module 218 to present the latest clusters, enabling end-users to make informed decisions regarding potential action items related to the SDLC artifacts.

The disclosure disclosed herein is advantageous in manner that it provides a robust and adaptable system for continuous clustering of SDLC artifacts, enhancing the overall efficiency and effectiveness of software development processes.

The continuous clustering of SDLC artifacts, specifically defects, user stories, and test cases, addresses the dynamic nature of the software development process. By adapting to the ongoing evolution of data within the SDLC, continuous clustering ensures that the clustering model remains relevant, up-to-date, and reflective of the current state of the project. This adaptability is relevant for extracting meaningful and actionable insights, allowing project teams to identify patterns, anomalies, and hotspots in the evolving SDLC data, ultimately contributing to more informed and efficient software development practices.

Unlike previous applications of topic modeling for a static set of defects, user stories, or test cases, the system disclosed herein involves the continuous application of topic modeling. This entails ongoing clustering or hotspot generation for a plurality of software delivery lifecycle artifacts, including defects, user stories, and test cases, along a contiguous timeline.

Moreover, the disclosure addresses the deficiency in contextual understanding provided by traditional topic models, the system automatically generates meaningful and contextually relevant names for topics using Large Language Model (LLM). This enhancement facilitates efficient and rapid utilization of hotspots by end-users.

Additionally, the system facilitates Subject Matter Experts (SMEs) to rectify misallocations made by the topic model owing to the poorly written descriptions associated with entity IDs.

Those skilled in the art will realize that the above-recognized advantages and other advantages described herein are merely exemplary and are not meant to be a complete rendering of all the advantages of the various embodiments of the present disclosure.

In the foregoing complete specification, specific embodiments of the present disclosure have been described. However, one of ordinary skills in the art appreciates that various modifications and changes can be made without departing from the scope of the present disclosure. Accordingly, the specification and figures are to be regarded in an illustrative rather than a restrictive sense. All such modifications are intended to be included within the scope of the present disclosure.

We claim:

1. A system, comprising:
   a processor; and
   a computer-readable storage medium communicatively coupled to the processor and storing program instructions which, when executed by the processor, causes the processor to perform a method comprising:
   receiving a continuous stream of software development lifecycle (SDLC) artifacts from a heterogenous data source;
   preprocessing the continuous stream of SDLC artifacts;
   generating, based on application of topic modelling on SDLC data, a first set of topics;
   clustering each SDLC artifact into a topic of the first set of topics based on keywords;
   detecting an updated stream of SDLC artifacts;
   dynamically generating a second set of topics in response to detecting the updated stream of SDLC artifacts;
   evaluating a similarity between the first set of topics and the second set of topics, wherein evaluating comprises determining if a count of topics in the first set of topics and the second set of topics are the same;
   clustering, if the count of topics in the first set of topics and the second set of topics are same, each SDLC artifact of the updated stream of SDLC artifacts into a topic of the first set of topics based on the keywords;
   re-clustering, if the count of topics in first set of topics is less than the second set of topics, each SDLC artifact of the updated stream of SDLC artifacts, including already clustered artifacts, based on revised set of topics; and
   displaying visualization depicting allocation of SDLC artifacts into topics dynamically updated based on ongoing clustering process.

2. The system of claim 1, wherein the re-clustering into the second set of topics comprises a probable reallocation of one or more SDLC artifacts from a topic of the first set of topics to a new topic or existing topics present in the second set of topics.

3. The system of claim 1, wherein the preprocessing comprises tokenization and lemmatization of the SDLC artifacts, filtering by POS tags, removing unwanted data, transforming the SDLC data in lowercase and removing stop words, duplicates and spaces.

4. The system of claim 1, further comprising:
   determining if a number of topics are available;
   in response to determining that the number of topics are not available, applying a coherence process to determine the number of topics based on an available number of records and a text data in each record associated with the updated stream of SDLC artifacts,
   wherein the coherence process analyzes relationships and patterns within the updated stream of SDLC artifacts to identify distinct topics,
   wherein the coherence process estimates the number of topics present in the SDLC artifacts by examining content and context of the records associated with the updated stream of SDLC artifacts;
   detecting if distribution of records is skewed, wherein the distribution of records is skewed if count of records in one or more topics exceeds a predefined percentage of a total record count;
   eliminating skewed keywords responsible for skewing the distribution of records in the one or more topics; and
   re-running the coherence process to determine the number of topics without an influence of skewed keywords.

5. The system of claim 1, further comprising:
   checking a Boolean condition to determine if a clustering model already exists;

in response to determining that a plurality of clustering models exists, the clustering model are used for clustering the SDCL artifacts; and in response to determining that no clustering model exist, a new clustering model is created to perform the clustering process on the SDCL artifacts.

6. The system of claim 5, wherein the new clustering model is created by:

selecting an appropriate clustering algorithm from one or more clustering algorithms based on a number of records in the updated stream of SDLC artifacts.

7. The system of claim 1, further comprising:

selecting a plurality of clustering models for clustering and re-clustering the SDLC artifacts based on a number of records; and mapping a existing clustering model with a new clustering model based on IDs and keywords and using a matching score based on the IDs and keywords to ensure accurate mapping.

8. The system of claim 1, further comprising:

facilitating Subject Matter Expert (SME) verification of cluster allocations, enabling correction of misallocated SDLC artifacts into appropriate clusters; and assigning keywords to ID of corrected SDLC artifacts, aiding in preserving their allocation within the corrected clusters and preventing reshuffling to incorrect clusters.

9. The system of claim 8, further comprising an automated feedback mechanism utilizing corrected cluster assignments by SMEs to improve clustering model.

10. The system of claim 1, wherein generating based on application of topic modelling comprises unsupervised topic modelling.

11. The system of claim 1, wherein generating further comprises assigning a unique topic name to each topic of initial set of topics based on keywords derived from the SDLC artifacts.

12. A computer-implement method, comprising:

receiving, by one or more processors, a continuous stream of software development lifecycle (SDLC) artifacts;

preprocessing, by one or more processors, the continuous stream of SDLC artifacts;

generating, by one or more processors, based on application of topic modelling on SDLC data, a first set of topics;

clustering, by one or more processors, each SDLC artifact into a topic of the first set of topics based on keywords;

detecting, by one or more processors, an updated stream of SDLC artifacts;

dynamically generating, by one or more processors, a second set of topics in response to detecting the updated stream of SDLC artifacts;

evaluating, by one or more processors, a similarity between the first set of topics and the second set of topics, wherein evaluating comprises determining if a count of topics in the first set of topics and the second set of topics are the same;

clustering, by one or more processors, if the count of topics in the first set of topics and the second set of topics are same, each SDLC artifact of the updated stream of SDLC artifacts into a topic of the first set of topics based on the keywords;

re-clustering, by one or more processors, if the count of topics in first set of topics is less than the second set of topics, each SDLC artifact of the updated stream of SDLC artifacts, including already clustered artifacts, based on revised set of topics; and displaying, by one or more processors, visualization depicting allocation of SDLC artifacts into topics dynamically updated based on ongoing clustering process.

13. The computer implemented method of claim 12, wherein the re-clustering into the second set of topics comprises a probable reallocation of one or more SDLC artifacts from a topic of the first set of topics to a new topic or existing topics present in the second set of topics.

14. The computer implemented method of claim 12, wherein the preprocessing comprises, tokenization and lemmatization of the SDLC artifacts, filtering by POS tags, removing unwanted data, transforming the SDLC data in lowercase and removing stop words, duplicates and spaces.

15. The computer implemented method of claim 12, wherein the generating comprises:

determining, by one or more processors, if a number of topics are available;

in response to determining that the number of topics are not available, applying, by one or more processors, a coherence process to determine the number of topics based on available number of records and text data in each record associated with the updated stream of SDLC artifacts, wherein the coherence process analyzes the relationships and patterns within the updated stream of SDLC artifacts to identify distinct topics, wherein the coherence process estimates the number of topics present in the SDLC artifacts by examining content and context of the records associated with the updated stream of SDLC artifacts;

detecting, by one or more processors, if distribution of records is skewed, wherein the distribution of records is skewed if count of records in one or more topics exceeds a predefined percentage of a total record count;

eliminating, by one or more processors, skewed keywords responsible for skewing the distribution of records in the one or more topics; and re-running, by one or more processors, the coherence process to determine the number of topics without an influence of skewed keywords.

16. The computer implemented method of claim 12, wherein the clustering comprises:

checking, by one or more processors, a Boolean condition to determine if a clustering model already exists;

in response to determining that a plurality of clustering models exists, the clustering model are used, by one or more processors, for clustering the SDCL artifacts; and in response to determining that no clustering model exist, a new clustering model is created, by one or more processors, to perform the clustering process on the SDCL artifacts.

17. The computer implemented method of claim 16, wherein a new clustering module is created by:

selecting, by one or more processors, an appropriate clustering algorithm from one or more clustering algorithms based on a number of records in the updated stream of SDLC artifacts.

18. The computer implemented method of claim 12, further comprising:

selecting, by one or more processors, a plurality of clustering models for clustering and re-clustering the SDLC artifacts based on a number of records; and mapping, by one or more processors, a existing clustering model with a new clustering model based on IDs and keywords and using a matching score based on the IDs and keywords to ensure accurate mapping.

19. The computer implemented method of claim 12, further comprising:

facilitating, by one or more processors, Subject Matter Expert (SME) verification of cluster allocations, enabling correction of misallocated SDLC artifacts into appropriate clusters; and assigning, by one or more processors, keywords to ID of corrected SDLC artifacts, aiding in preserving their allocation within the corrected clusters and preventing reshuffling to incorrect clusters.

20. The computer implemented method of claim 19, further comprising an automated feedback mechanism utilizing corrected cluster assignments by SMEs to improve clustering model.

21. The computer implemented method of claim 12, wherein generating based on application of topic modelling comprises unsupervised topic modelling.

22. The computer implemented method of claim 12, wherein generating further comprises assigning a unique topic name to each topic of initial set of topics based on the keywords derived from the SDLC artifacts.

\* \* \* \* \*